Figure 1:
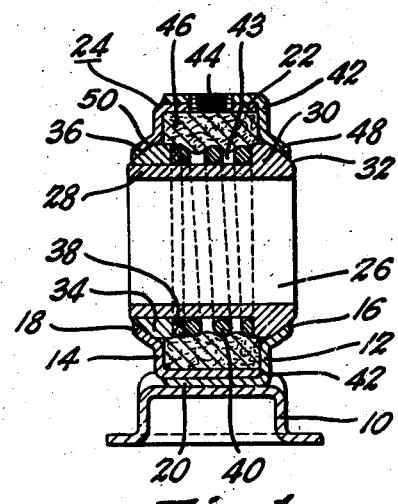

Jan. 20, 1942.   C. R. TALMAGE ET AL   2,270,392
SELF-ALIGNING BEARING
Filed Aug. 10, 1939

C. Robert Talmage
and Edgar B. Lau
INVENTORS

ATTORNEYS

Patented Jan. 20, 1942

2,270,392

UNITED STATES PATENT OFFICE 2,270,392

SELF-ALIGNING BEARING

Charles Robert Talmage and Edgar B. Lau, Dayton, Ohio, assignors to General Motors Corporation, Detroit, Mich., a corporation of Delaware Application August 10, 1939, Serial No. 289,344

5 Claims. (Cl. 308—26)

This invention relates to bearings, and more particularly to the self aligning type of bearing.

An object of this invention is to provide a self aligning bearing structure wherein the structure includes a two part bearing in which the two parts are telescopically associated with each other to provide axial movement of the parts relative to one another.

A further object of the invention is to provide means whereby a two part bearing may be expanded to form a sealing engagement with its housing and be rotatable with respect to the housing.

Further objects and advantages of the present invention will be apparent from the following description, reference being had to the accompanying drawing wherein a preferred embodiment of the present invention is clearly shown.

Figure 2:
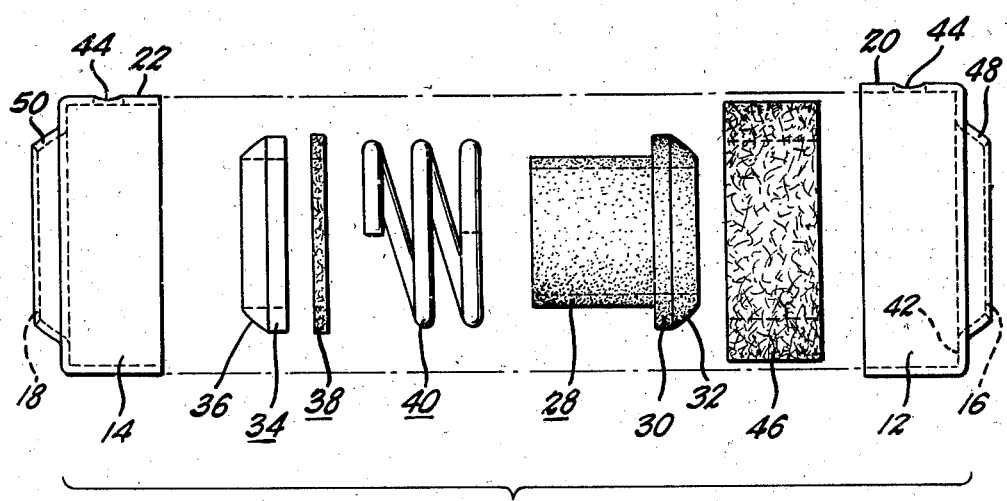

In the drawing:

Fig. 1 is a sectional view showing the preferred embodiment of the present invention; and Fig. 2 is an expanded view showing the parts of the assembly.

In the drawing the numeral 10 designates a base to which the self aligning structure may be secured in any suitable manner. Two cup-shaped stamped metal members 12 and 14 are provided, which have central apertures 16 and 18 respectively therein, and include annular flanges 20 and 22 respectively thereon which are adapted to interfit to form a unitary housing 24 for a bearing assembly 26. When the members 12 and 14 are assembled, apertures 16 and 18 are in alignment.

The bearing assembly 26 consists of a sleeve 28 preferably of porous metal which has a flange 30 at one end, thereof, that includes a spherical surface thereon as at 32. A ring member 34 which may be made of any suitable material, is provided and is slidable over the sleeve 28 and includes a spherical surface 36 which when the parts are assembled is opposed to the surface 32. Fitted over sleeve 28 and immediately adjacent the ring member 34 is a resilient packing member 38 which forms a seal for the ring member 34 when the ring member is in position on the sleeve 28. Interposed between the flange 30 on sleeve 28 and the ring member 34 is a coil spring 40, one end of which bears directly against the flange 30, and the other end of which bears against the sealing member 38 to exert its pressure on the ring member 34. In assembly the bearing structure is set in member 12, and then member 14 is pressed therein so that the flanges 20 and 22 interfit to form a substantially unitary housing 24. The flange 22 is made just the right width so as to bottom against ridge 42, formed in part 12, when the parts 12 and 14 are assembled. Parts 12 and 14 are preferably a tight press fit holding together when assembled, however, if further precaution against the members coming apart is desired, they may be spot welded together or a set screw may be utilized etc.

Parts 12 and 14 also form an annular oil reservoir 43 around the external surface of the bearing 26 whereby oil may be introduced into the reservoir through a suitable hole 44 and thereby seep through the bearing, with the aid of capillarity, and exude at the bearing surface thereof. In order to hold the oil in contact with the external surface of the bearing and simultaneously aid in preventing escape of the oil, an annular washer 46 of absorbent material is provided around the bearing in engagement therewith. In this manner the absorbent washer absorbs oil and maintains a supply of lubricant adjacent the external surface of the bearing at all times. The oil hole 44 is formed by a pair of registering apertures in the members 12 and 14 and may be tapped after assembly, thus aiding to hold the members 12 and 14 together.

As shown in the drawing, the spherical surfaces 32 and 36 of the bearing member 26, are in engagement with complementary annular flanges 48 and 50 of the members 12 and 14, respectively, the engagement of the surfaces 32 and 36 with flanges 48 and 50 is accomplished by the coil spring 40 which tends to urge flange 30 and ring member 34 apart and against the housing 24, thereby causing the bearing to constantly exert a predetermined sealing pressure when in any position with respect to the housing while the bearing is simultaneously rotatable with respect to the housing.

It is apparent that while the bearing as illustrated is preferably of the porous metal type, that the bearing may be constructed of any composition such as steel, wood, or some other suitable bearing material and yield similar satisfactory results.

Furthermore a bearing structure of two parts, which are telescopically associated with one another and have a common expanding means, is a distinct advantage over previous types in that it affords a simultaneously self aligning rotatable sealing structure. With a structure of this type it will readily be seen that even though the bearing is rotatable within its housing and may be shifted into various positions with respect to its housing, it affords an effective seal against oil leakage while performing its duties as a bearing thereby presenting an economical and highly efficient self aligning structure which is easily assembled and which eliminates all inaccuracies in alignment that have been so common in the past during the assembly operation.

If desired sleeve 28 of the bearing may be of sufficient length to pass through the central aperture in its associated housing member and act as a limiting means whereby the degree of rotation of the bearing within the housing is limited by engagement of the sleeve with the housing.

While the embodiment of the present invention as herein disclosed, constitutes a preferred form, it is to be understood that other forms might be adopted, all coming within the scope of the claims which follow:

What is claimed is as follows:

1. A self aligning bearing structure comprising in combination; a housing member; a rotatable bearing assembly carried within the housing and rotatable with respect thereto, said bearing assembly including a porous metal bearing sleeve having an integral flange at one end thereof, and a collar slidable over and journaled on said sleeve, said flange and collar being adapted to bear against portions of the housing; and expanding means acting against the flange and the collar for expanding the bearing into engagement with the housing whereby the bearing assembly is held in fluid sealing relation to said housing.

2. A self aligning bearing structure comprising in combination; a housing member; a rotatable porous metal bearing having an integral flange at one end thereof which includes an annular spherical surface; a collar slidable over and journaled on the bearing member, said collar including an annular spherical surface opposed to said first mentioned spherical surface, said bearing and collar being adapted to fit within said housing and bear against portions of the housing; spring means interposed between said flange and said collar for simultaneously expanding the bearing member and maintaining it in any predetermined position with respect to the housing and for causing said assembly to be held in fluid sealing relation to said housing.

3. A self aligning bearing assembly comprising in combination; a housing member; a rotatable bearing assembly carried within the housing, said bearing assembly comprising a two part bearing, said two parts being telescopically associated with each other for permitting axial movement of the parts relative to one another at least one of said parts being formed from porous metal; and expanding means acting between the said two parts for axially expanding the said parts into fluid sealing engagement with the housing.

4. A self aligning bearing assembly comprising in combination; a housing member; a rotatable bearing assembly carried within the housing, said bearing assembly comprising a two part bearing having opposed flanges thereon, and in which at least one of the two parts is of a porous metal composition; and spring means interposed between the said two parts for axially expanding the two parts into fluid sealing engagement with the housing walls; and a lubricant reservoir disposed around the porous metal part and formed by the housing and the porous metal part.

5. A self aligning bearing structure comprising in combination; a bearing assembly comprising a porous metal bushing having a flange at one end thereof, said flange including a spherical surface, and a collar slidable over the bushing, said collar including a spherical surface opposed to said first named spherical surface; a pair of stamped sheet metal cup shaped members having central perforations therein and adapted to be tightly interfitted to form a housing for said bearing assembly; a fluid reservoir, consisting of a chamber extending around at least a portion of the bearing, said fluid reservoir being formed by portions of the housing and the bushing; a coil spring disposed around the bushing and between the collar and the flange of the bearing assembly for axially expanding the bearing assembly and maintaining it in sealed engagement with the housing; said housing having an oil inlet to said reservoir.

E. B. LAU.
CHARLES ROBERT TALMAGE.